(12) United States Patent
Brault et al.

(10) Patent No.: US 6,622,475 B2
(45) Date of Patent: Sep. 23, 2003

(54) BLEED SYSTEM DRIVEN IN SIMPLIFIED MANNER FOR A TURBOJET OR TURBOPROP ENGINE

(75) Inventors: Michel Gilbert Brault, Boussy St. Antoine (FR); Pascal Noël Brossier, St. Martin en Biere (FR)

(73) Assignee: SNECMA Moteurs, Paris (FR)

( * ) Notice: Subject to any disclaimer, the term of this patent is extended or adjusted under 35 U.S.C. 154(b) by 1 day.

(21) Appl. No.: 10/120,478

(22) Filed: Apr. 12, 2002

(65) Prior Publication Data

US 2002/0148216 A1 Oct. 17, 2002

(30) Foreign Application Priority Data

Apr. 12, 2001 (FR) .............................. 01 05017

(51) Int. Cl.[7] .............................. F02K 3/04; F02C 7/05; F02C 9/18
(52) U.S. Cl. ...................... 60/226.3; 60/785; 60/39.092
(58) Field of Search .............................. 60/226.1, 226.3, 60/785, 39.092

(56) References Cited

U.S. PATENT DOCUMENTS

| | | | | |
|---|---|---|---|---|
| 3,632,223 A | * | 1/1972 | Hampton | 415/144 |
| 4,086,761 A | | 5/1978 | Schaut et al. | |
| 4,463,552 A | | 8/1984 | Monhardt et al. | |
| 4,546,605 A | * | 10/1985 | Mortimer et al. | 60/785 |
| 4,827,713 A | * | 5/1989 | Peterson et al. | 60/226.1 |
| 4,844,689 A | * | 7/1989 | Seed | 415/169.1 |
| 4,881,367 A | * | 11/1989 | Flatman | 60/785 |
| 5,155,993 A | * | 10/1992 | Baughman et al. | 60/226.1 |
| 5,261,228 A | * | 11/1993 | Shuba | 60/226.3 |
| 5,351,478 A | * | 10/1994 | Walker et al. | 60/785 |
| 5,477,673 A | * | 12/1995 | Blais et al. | 60/785 |
| 6,086,326 A | * | 7/2000 | Honda et al. | 60/785 |

FOREIGN PATENT DOCUMENTS

| | | |
|---|---|---|
| EP | 0 374 004 A1 | 6/1990 |
| EP | 0 407 297 A1 | 1/1991 |
| EP | 0 902 179 A2 | 3/1999 |
| GB | 936635 | 9/1963 |
| GB | 987625 | 3/1965 |
| GB | 2 014 663 A | 8/1979 |
| GB | 2 259 328 A | 3/1993 |

* cited by examiner

*Primary Examiner*—Ted Kim
(74) *Attorney, Agent, or Firm*—Bacon & Thomas, PLLC

(57) ABSTRACT

A bypass gas turbine engine having an intermediate structural casing positioned between a primary flow path and a bypass flow path, and configured between a low pressure compressor and a high pressure compressor. The engine further having a bleed device arranged to deflect a portion of a gas flow from the low pressure compressor toward the bypass flow path. The bleed device includes an annular cavity defining a manifold situated upstream the intermediate casing and opening along the outer wall of the primary flow path, a plurality of conduits positioned along the intermediate casing, a plurality of tubes configured around the high pressure compressor and connecting the conduits to the bypass flow path, and at least one flow regulating valve disposed along the interior of each of the plurality of tubes.

5 Claims, 2 Drawing Sheets

BLEED SYSTEM DRIVEN IN SIMPLIFIED MANNER FOR A TURBOJET OR TURBOPROP ENGINE

BACKGROUND OF THE INVENTION

The present invention relates to a gas turbine engine, and more particularly to a bypass turbojet engine having a gas flow bleed system.

A bypass turbojet engine having a high bypass ratio comprises, in view of the direction of gas flow, a low pressure compressor followed downstream by a high pressure compressor which supplies compressed air to a combustion chamber. In the combustion chamber the air is mixed with a pressurized fuel and burned in order to apply power downstream the chamber to a high pressure turbine driving the high pressure compressor, and to a low pressure turbine positioned downstream and arranged to drive the fan and the low pressure compressor. The gases at the turbine exhaust apply a residual thrust in addition to the thrust generated by the gases moving through the bypass flow path.

Under certain flight conditions, for instance under reduced load in the course of aircraft descent, the airflow delivered by the low pressure compressor may be excessive for appropriate engine operation, and consequently a portion of the airflow must be deflected toward the bypass flow path to preclude a so-called "surge phenomenon" caused by the fluid filaments detaching off the blades which results in flow instability.

Moreover, when the aircraft passes through dense clouds, water in the form of rain or hail may enter the compressors. At full engine power, this water is vaporized and the steam is hot enough and sufficiently atomized so that the combustion chamber is not extinguished. During aircraft operations such as this, the combustion chamber receives a relatively high flow of fuel. On the other hand, when the aircraft is undergoing a descent or approach operation prior to landing, the engine turns slowly, and consequently the compression ratios of the compressor are comparatively low and water in the liquid or solid state is present therein. During this operation, the combustion chamber receives a relatively low flow of fuel. As a result, water may reach the combustion chamber and therefore extinguish some or all of the burners. The presence of large quantities of water in the combustion chamber, therefore, may lead to serious results.

Accordingly, turbojet-engine bleed device systems generally are used and include mobile scoops which, when driven by complex control means, enter the primary flow path in an annular space separating high and low pressure compressors. Because the angular space often has a gooseneck-shaped profile, and since water particles on account of their density are moving along the outer wall of the primary flow path, the particles may get trapped by the scoops and be deflected toward the bypass flow path.

British patent 2,259,328 discloses such a bleed system wherein the scoops are driven by a synchronizer configured in the intermediate casing so as to direct the diverted air and the particles toward stationary tubes that exhaust them into the secondary flow path downstream of engine support struts.

European patent 0,407,297 discloses the insertion of traps in the inner and outer walls of an inner flow path casing, whereby these traps are synchronized and radially displaced outwards.

European patent 0,374,004 discloses the use of traps that cooperate with a scooping device and are configured along the outer wall of the primary flow path.

In all of the aforementioned bleed systems, the devices driving the scoops and the traps are configured along the inner flow path and operate synchronously. These drive devices are arranged with a control ring, linkrods, hydraulic actuators or cables to drive traps or hinging scoops. These devices are fairly complex, and moreover difficult to access for maintenance and overhaul.

SUMMARY OF THE INVENTION

Accordingly, it is an objective of the present invention to create a bypass gas turbine engine wherein the bleed devices are generally constituted by stationary elements.

Thus, the present invention relates to a bypass gas turbine engine and in particular, to an aircraft bypass turbojet engine which, between the primary and the bypass flow paths, is fitted with a structural intermediate casing configured axially between a low pressure compressor and a high pressure compressor and further includes a bleed device implementing the deflection of a portion of the gas flow issuing from the low pressure compressor toward the bypass flow path.

This gas turbine engine is characterized in that the bleed device comprises an annular cavity operating as a manifold which is situated upstream from the intermediate casing along the outer wall of the primary air flow path and permanently communicates with the primary flow path. The bleed device further includes a plurality of substantially axial conduits disposed in the intermediate casing which are connected to the manifold, and a plurality of tubes configured around the high pressure compressor to permit communication between the conduits and the bypass flow path. Each of the tubes is filled with at least one regulating valve.

Advantageously, the intermediate casing and the conduits are cast as a single, integral unit. The intermediate casing includes a plurality of radial arms and the conduits are configured between the radial arms.

Preferably, the manifold communicates with the primary air flow path by means of a plurality of orifices defined along the outer wall of the inner flow path and of which form an inducer.

In a highly advantageous manner, the flow-regulating valves are driven separately one from another.

In this manner, when all of the regulating valves are in an open position, a high outflow of air is diverted from the primary air flow path and directed toward the bypass flow path by means of the annular manifold, the conduits and the tubes.

If only one regulating valve is open, only a slight airflow is fed from the primary air flow path. This low airflow is taken from the radially outer zone of the primary flow path which is rich in water particles. In this case, the bleed system acts as a particle trap. This function also applies when all the valves are set in a low output position.

The inducer separating the primary air flow path from the manifold leads to aerodynamic continuity of the primary flow path when the flow regulating valves are closed.

Integral with the intermediate casing, the conduits advantageously increase the mechanical rigidity of the intermediate casing.

The bleed device of the present invention is free of any moving parts in contact with the primary flow path and of any displaceable part in the structural intermediate casing. The flow regulating valves that are configured inside the tubes around the high pressure compressor and constitute assemblies which are easily exchanged for maintenance. Moreover, the invention is free of complex sealing means such as sealing elements around the traps and scoops.

Other advantages and features of the invention are elucidated in the illustrative description below and in relation to the attached drawings.

DETAILED DESCRIPTION OF THE PRESENT INVENTION

Figure 1:
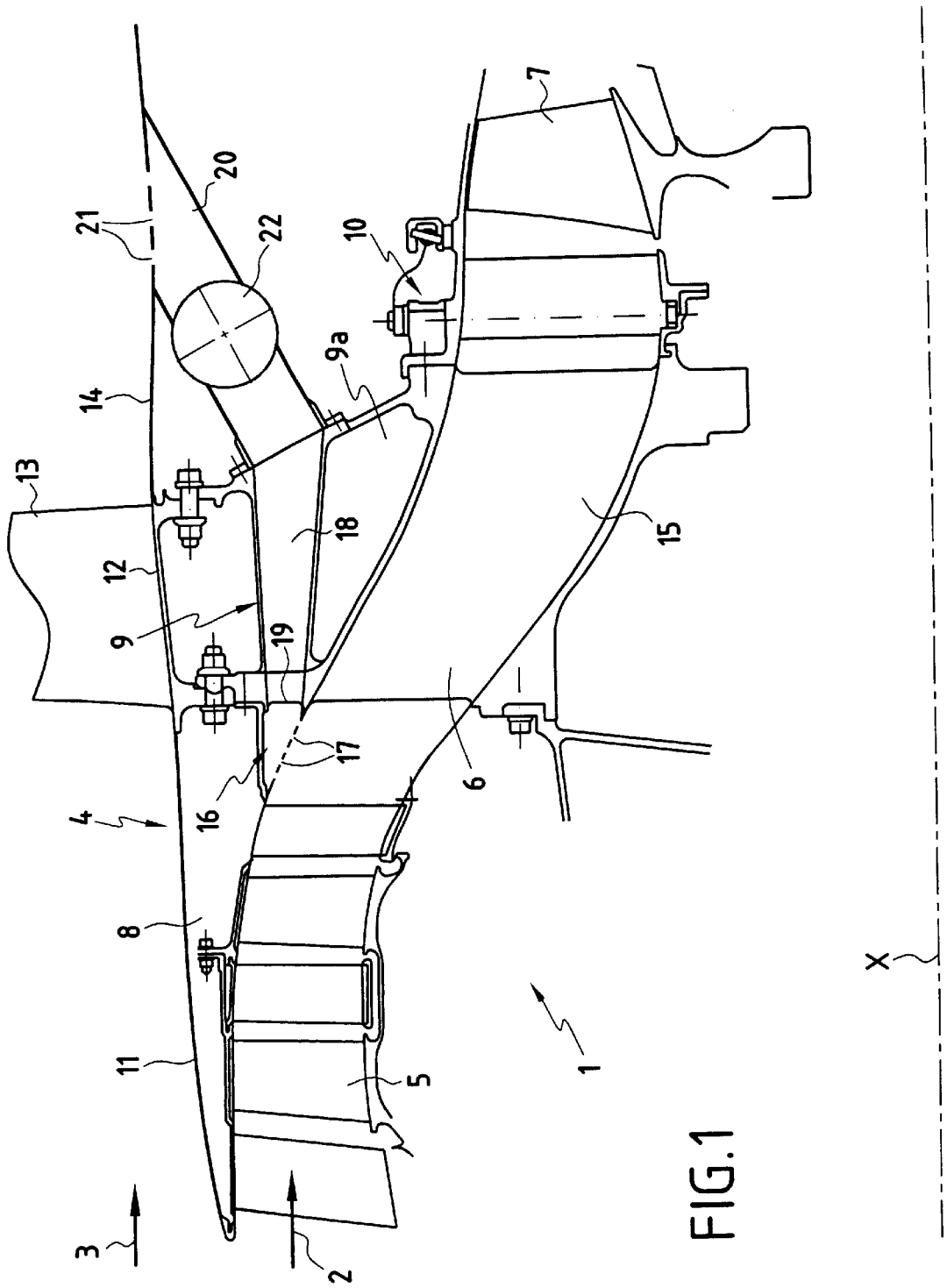
FIG. 1 shows a longitudinal half-section of the inter-flow path casing and of the upstream portion of the primary flow path displaying the bleed device of a turbojet engine of the present invention.

A turbofan jet engine 1 of axis X is shown in FIG. 1. At the front section of the engine is a fan (omitted in the drawings) that feeds air to a primary air flow path 2 and to an air bypass flow path 3. Both flow paths have an annular profile and an inter-flow path casing 4 separating one flow path from the other.

As seen in the upstream to downstream direction in FIG. 1, the primary flow path 2 contains a low pressure compressor 5, an annular conduit 6 having a gooseneck cross-sectional profile and a high pressure compressor 7 feeding compressed air to an omitted combustion chamber.

From upstream to downstream, the inter-flow path casing 4 includes a flow splitting spoiler 8 of which the inner wall constitutes the stator of the low pressure compressor 5, and a structural intermediate casing 9 which is fitted at its inside zone with the annular, gooseneck conduit 6 and the stator 10 of the high pressure compressor 7.

The bypass flow path 3 is internally bound by the outer wall 11 of the spoiler and by the inner platforms 12 of the engine support arms 13 which cross the bypass flow path 3 and of which are affixed to the periphery of the intermediate casing 9 by brackets and by covers 14 enclosing the stator 10 of the high pressure compressor 7.

Inside the annular conduit 6, the intermediate casing 9 is fitted with a plurality of radial arms 15 that transmit the fan generated stresses through the annular portion 9a of the intermediate casing 9 enclosing the annular conduit 6 to the support arms 13.

In its inner region adjacent to the intermediate casing 9, the splitting spoiler 8 of the invention comprises an annular cavity 16 enclosing the flow path 2 and is configured axially between the last stage of the low pressure compressor 5 and the radial arms 15.

Annular cavity 16 always communicates with the primary flow path 2 by means, for instance, of a plurality of orifices 17 constituting an inducer and configured along the outer wall of the primary flow path 2 which defines the cavity 16. This cavity 16 is defined along the rear side of the splitting spoiler 8.

Annular portion 9a of the intermediate casing 9 encloses the annular conduit 6 and comprises a plurality of substantially axial conduits 18 terminating upstream through orifices 19 into the annular cavity 16 and terminating downstream into the rear side of the annular portion 9a.

Conduits 18 extend around the stator 10 of the high pressure compressor 7 and slanting tubes 20 lead to a plurality of orifices 21 defined along covers 14 of the secondary flow path 3.

Each tube 20 is arranged with a flow-regulating valve 22 independently adjustable from the others. The regulation valve may be of any kind, for instance, it may be a spherical valve or a slide-gate valve, and the pivot axis of valve may be arbitrarily positioned. Since valves 22 are configured around the high pressure compressor 7, they are easily accessible since one need only open the outer covers 14 of the inter-flow path casing to assure access to the valves 22.

Figure 2:
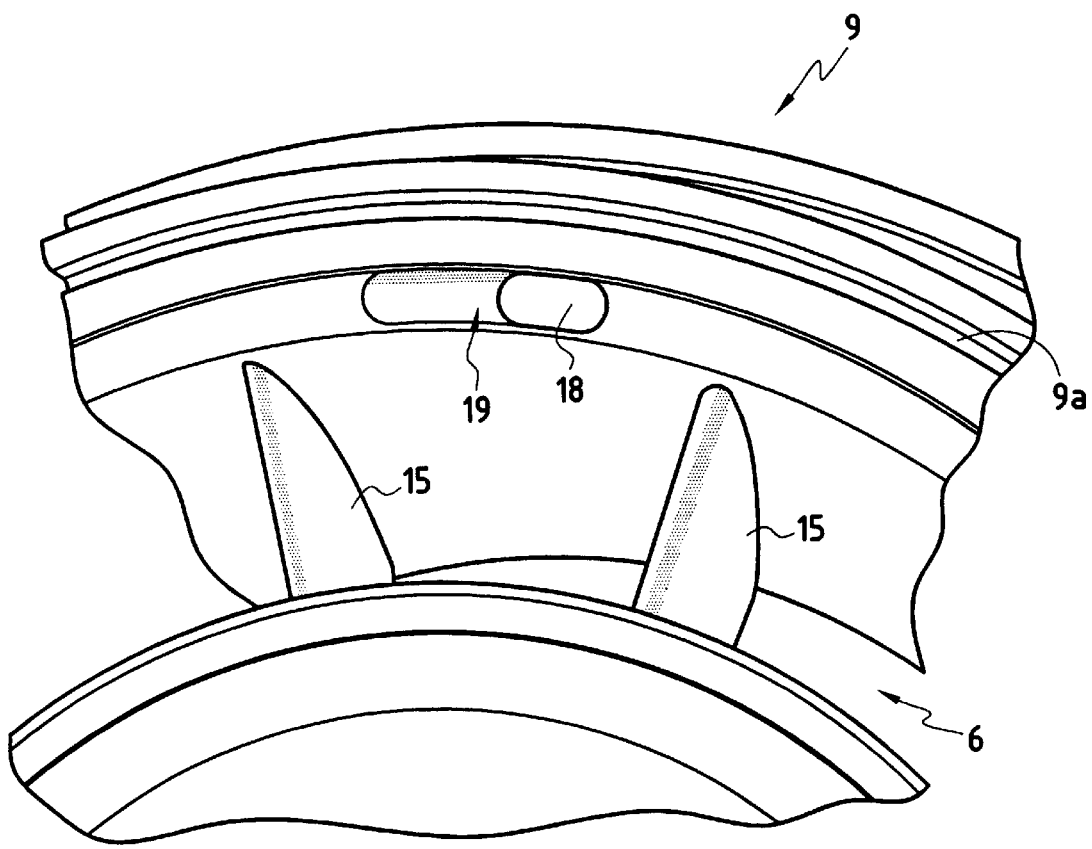
FIG. 2 is a perspective front view of part of the intermediate casing.

As shown in FIG. 2, conduits 18 are preferably configured in the circumferential space separating two adjacent radial arms 15 that extend into the outer annular part 9a of the intermediate casing.

In a very advantageous manner, conduits 18 and the intermediate casing 9 are integral either by casting or by being welded together. Because the conduits 18 are configured axially, the mechanical strength of the intermediate casing 9 is reinforced to transmit stresses, in particular, from the fan.

Since the cavity 16 acts as a manifold outside the intermediate casing 9 with its air inducer in the primary flow path 2, bleed orifices need not be situated between radial arms 15 in the wall of the intermediate casing 9 enclosing the primary flow path 2. Accordingly, the casting and machining of the intermediate casing 9 is simplified.

The air is diverted by means of an annular array of orifices 17. This feature limits aerodynamic distortions at the high pressure compressor 7.

Operation of the bleed system of the present invention is as follows:

When valves 22 regulating the flow in the tubes 20 are closed, air is prevented from passing through the tubes and no air is able to pass through the conduits 18. The air in the cavity 16 and in the conduits 18 is therefore at a pressure depending on the engine operational mode. This results in no air passing through the orifices 17 of the inducer and aerodynamic continuity of the outer wall of the primary flow path 2 is maintained.

When the valves 22 are set at a low flow position, or a single one is set in the wide open position while the others are closed, a slight airflow passes through the orifices 17 in the cavity 16 and is evacuated into the bypass flow path 3. This slight air flow is bled from the vicinity of the outer wall of the primary flow path and contains most of the particles, in particular water droplets that entered the inlet of the primary flow path 2 on account of the curvature in this zone of the outer wall of the primary flow path and of the densities of the water particles.

When all of the valves 22 are in a high flow, open position, a higher rate of air is moved toward the primary flow path on account of the pressure differentials between the collection zone and the bypass flow path 3, and on account of fewer pressure drops in the tubes 20.

It will of course be appreciated that the invention is not confined to the particular embodiment described herein, but is intended to embrace all possible variations which might be made to it without departing from either the scope or spirit of the invention.

We claim:

1. A bypass gas turbine engine for an aircraft having an intermediate structural casing (9) positioned between a primary flow path (2) bounded by inner and outer walls and a bypass flow path (3), and axially configured between a low pressure compressor (5) and a high pressure compressor (7), said engine further having a bleed device arranged to deflect a portion of a gas flow from the low pressure compressor (5) toward the bypass flow path (3), said bleed device comprising:

- an annular cavity (16) defining a manifold situated upstream said intermediate casing (9) and opening along the outer wall of the primary flow path (2), said manifold permanently communicating with said primary flow path (2);
- a plurality of conduits (18) substantially axially aligned with a central axis of said engine and positioned along the intermediate casing (9), said plurality of conduits connecting to said manifold (16);
- a plurality of tubes (20) configured around the high pressure compressor (7) and connecting said conduits (18) to the bypass flow path (3); and
- at least one flow regulating valve (22) disposed along the interior of each of said plurality of tubes and cooperating therewith to regulate the gas flow disposed therein.

2. The bypass gas turbine engine according to claim 1 wherein the intermediate casing (9) and the conduits (18) constitute a single, integral unit and being manufactured by casting or welding.

3. The bypass gas turbine engine according to claim 1 or 2 wherein the intermediate casing (9) includes a plurality of radial arms (15) configured such that the conduits (18) are positioned along a circumferential space separating adjacent ones of said radial arms (15) extending towards an outer annular portion (9a) of said intermediate casing (9).

4. The bypass gas turbine engine according to claim 1 wherein the manifold (16) communicates with the primary flow path via an inducer having a plurality of orifices defined along the outer wall of the primary flow path.

5. The bypass gas turbine engine according to claim 1 wherein the flow regulating valves are adjustable within each of said plurality of tubes in dependently from one another.

* * * * *